US009977743B2

(12) United States Patent
Leslie-Hurd et al.

(10) Patent No.: US 9,977,743 B2
(45) Date of Patent: May 22, 2018

(54) MANAGING ENCLAVE MEMORY PAGES

(71) Applicant: Intel Corporation, Santa Clara, CA (US)

(72) Inventors: Rebekah M. Leslie-Hurd, Portland, OR (US); Francis X. McKeen, Portland, OR (US); Carlos V. Rozas, Portland, OR (US); Somnath Chakrabarti, Portland, OR (US); Asit Mallick, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 15/252,719

(22) Filed: Aug. 31, 2016

(65) Prior Publication Data
US 2018/0060237 A1    Mar. 1, 2018

(51) Int. Cl.
G06F 12/08      (2016.01)
G06F 21/57      (2013.01)
G06F 12/0817    (2016.01)
G06F 12/0808    (2016.01)
(Continued)

(52) U.S. Cl.
CPC ........ *G06F 12/0824* (2013.01); *G06F 12/084* (2013.01); *G06F 12/0808* (2013.01); *G06F 12/0811* (2013.01); *G06F 21/572* (2013.01); G06F 2212/1008 (2013.01); G06F 2212/1052 (2013.01); G06F 2212/152 (2013.01); G06F 2212/60 (2013.01); G06F 2212/62 (2013.01); G06F 2221/032 (2013.01)

(58) Field of Classification Search
CPC ............. G06F 12/0808; G06F 12/0811; G06F 12/0824; G06F 12/084; G06F 2212/032; G06F 2212/1008; G06F 2212/1052; G06F 2212/152; G06F 2212/60; G06F 2212/62
See application file for complete search history.

(56) References Cited

U.S. PATENT DOCUMENTS

2005/0018152 A1    1/2005  Ting et al.
2010/0287347 A1   11/2010  Cameron et al.
2013/0198853 A1    8/2013  McKeen et al.
(Continued)

FOREIGN PATENT DOCUMENTS

KR    1020140093082 A    7/2014

OTHER PUBLICATIONS

PCT Notification of Transmittal of The International Search Report and The Written Opinion of The International Searching Authority for PCT Application No. PCT/US2017/044961, dated Nov. 8, 2017, 14 pages.

*Primary Examiner* — Aracelis Ruiz
(74) *Attorney, Agent, or Firm* — Lowenstein Sandler LLP

(57) ABSTRACT

A processing device includes a first counter having a first count value of a number of child pages among a plurality of child pages present in an enclave memory of a first virtual machine (VM). The plurality of child pages are associated with a parent page in the enclave memory. The processing device includes a second counter having a second count value of a number of child pages among the plurality of child pages not present in the enclave memory and being shared by a second VM, wherein the second VM is different from the first VM. A non-zero value of at least one of the first counter or the second counter prevents eviction of the parent page from the enclave memory.

25 Claims, 13 Drawing Sheets

(51) Int. Cl.
*G06F 12/0811* (2016.01)
*G06F 12/084* (2016.01)

(56) References Cited

U.S. PATENT DOCUMENTS

2014/0189325 A1* 7/2014 McKeen ............ G06F 9/30047
 712/225
2016/0246720 A1 8/2016 Pandey et al.

* cited by examiner

MANAGING ENCLAVE MEMORY PAGES

TECHNICAL FIELD

The implementations of the disclosure relate generally to computer systems, and more specifically, but without limitation, to managing enclave memory pages.

BACKGROUND

Modern processors are designed to protect sensitive data in memory from both hardware and software attacks. Some processors provide strategies that can reserve a portion of memory and enforce cryptographic protections on this portion of memory. The portion of memory may include a plurality of secure memory pages that are accessible on a secure platform.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
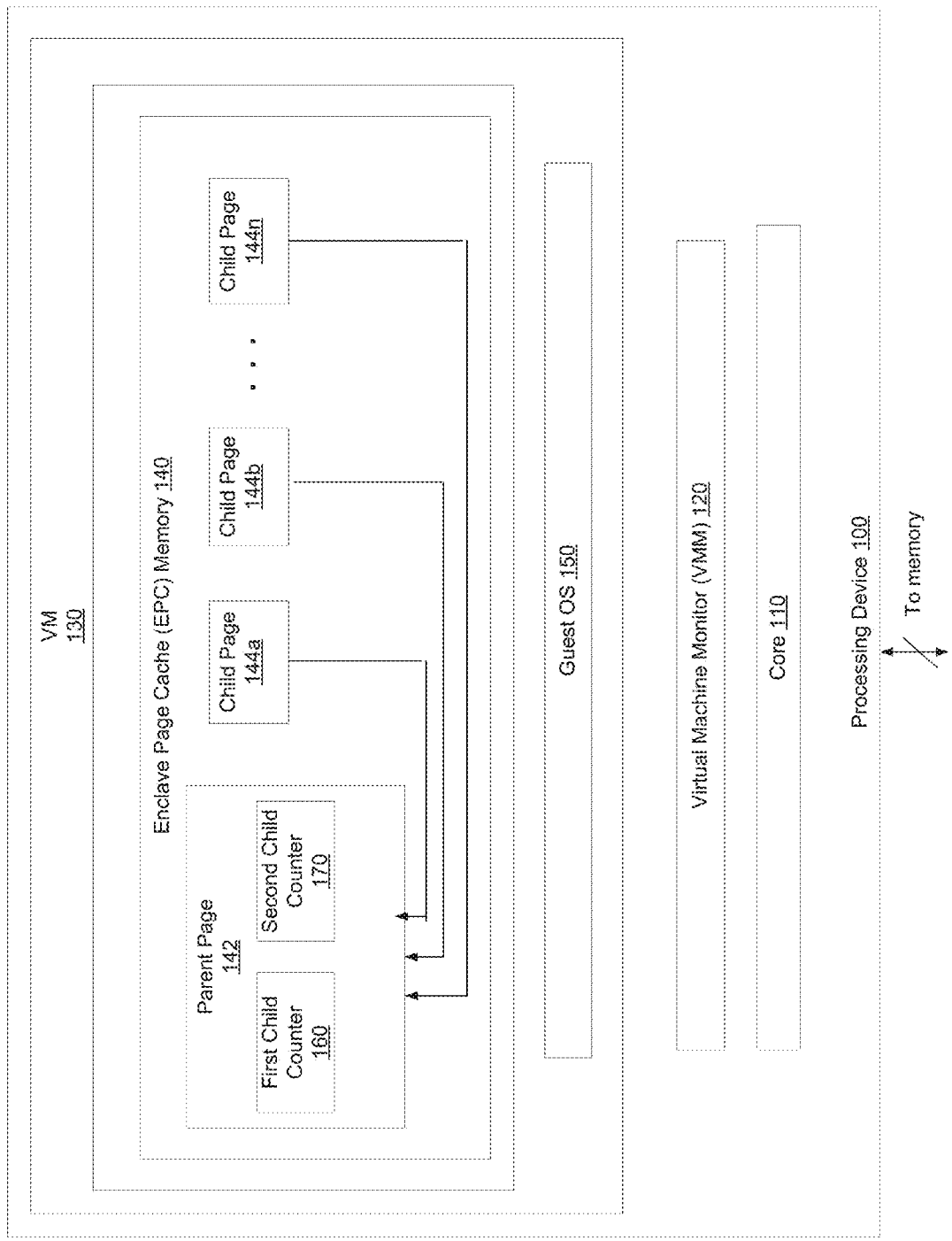
FIG. 1 illustrates a block diagram of a processing device implementing an enclave memory according to an implementation of the disclosure.

Implementations of the disclosure provide for management of enclave memory pages.

A processing device, such as a processor, may implement a trusted execution environment represented by enclave memory (EM). A trusted execution environment is a secure area of the processing device that ensures that applications and data loaded inside are to be protected with respect to confidentiality and integrity. The processing device may execute instructions residing in EM and access data residing in this protected memory, while preventing unauthorized access to the protected memory. Access to memory pages associated with the EM from applications not resident in the EM is prevented even if such access is attempted by a privileged application, such as basic input/output system (BIOS), operating systems or virtual machine monitors.

An active EM may be divided into an encrypted portion and a decrypted portion. The encrypted portion may reside in unprotected memory (such as main memory or disk). The decrypted portion may reside in an enclave page cache (EPC) associated with the EM. The EPC is protected memory used by the processing device to temporarily store the EM pages. The EPC includes EM pages, such as a parent page, and a plurality of child pages associated with the parent page. The parent page includes metadata about the EPC. Such metadata may include, but is not limited to, a size of a EPC base address of the EPC, a total number of child pages, etc. Each of the plurality of child pages includes an address, which points to an address of the parent page.

The processing device may implement several processes for managing EM pages in the EPC. Such managing may include paging instructions to securely move EM pages (parent and corresponding child pages) in and out of the EPC. The paging instructions may include, but are not limited to, loading of the EM pages into the EPC, accessing the EM pages in the EPC, and evicting the EM pages from the EPC.

In the trusted execution environment, one or more child pages are not allowed to be loaded into the EPC unless the corresponding parent page is present in the EPC. Conventionally, in order to support oversubscription (sharing of a parent page and the one or more child pages among a plurality of VMs), a virtual machine monitor (VMM) (also referred to as a hypervisor) that manages the plurality of VMs could remove one or more child pages physically from the EPC of a VM to provide them to another VM. In one implementation, the child page is physically removed by removing the content of the child page and storing the content in an encrypted form in memory, thus the child page is completely empty and is available to be evicted or removed from the EPC. If both the VMM and a guest OS of the VM are performing the management of the EM pages, situations may arise where the guest OS of the VM might attempt to remove the parent page from the EPC (of the VM) even when there are one or more child pages are physically removed from the EPC but are virtually present in the EPC. In conventional solutions, the guest OS would check a value of a first counter (a.k.a. physical counter) associated with the parent page, where the first counter increments in value when one or more child pages are physically loaded into the EPC and decrements in value when the one or more child pages are physically evicted from the EPC. Thus, when the VMM physically removes all child pages from the EPC, the value of the counter becomes 0, which indicates that no child page is associated with the parent page is present in the EPC of the guest. However, even though the child pages are removed from the EPC of the VM, these child pages physically removed but are not virtually removed due to VMM paging instructions to share the child pages with another VM. The VMM stores the content of the child pages of the EPC of the VM before physically removing the child pages from the EPC of the VM. As discussed above, content of the child page is stored in an encrypted form in a memory. The VMM may give the child pages to the other VM as the content of the child pages are empty and are requested by the other VM to be used as a resource in EPC of the other VM. However, the guest OS of the VM is not aware of that the child pages that are physically removed for sharing with the other VM and these child pages continue to be virtually present e in the EPC of the VM. Thus the guest OS of the VM is able to remove the parent page (as the first counter value is 0). However, when the parent page is removed from the EPC, the guest OS of the VM is not able to access a portion of the EPC and the VMM is not able to load the child pages back into the EPC of the VM.

In current implementations, in order to prevent the guest OS from removing a parent page from the EPC that still has child pages virtually present in the EPC, the VMM should exit all paging instructions by the guest OS and inject a failure when the OS attempts to remove the parent page from the EPC. In addition, by exiting all paging instructions, the VMM tracks where the parent page is located in the EPC.

In accordance with implementations of the disclosure, the VMM prevents the guest OS from removing the parent page from the EPC when the parent page has one or more child pages virtually present in the EPC. In one implementation, a second counter (a.k.a virtual counter) is added to metadata in the parent page to track the number of child pages that are virtually present in the EPC but are not currently physically present in the EPC due to the VMM paging. As discussed above, VMM paging supports oversubscription. In one implementation, a value of the second counter is incremented upon physical removal of the one more child pages from the EPC. In one implementation, the value of the second counter is decremented upon physically loading of the one or more child pages. Accordingly, in the implementations of the disclosure, the VMM checks the values of both the counters (i.e., first and second counters) prior to allowing the guest OS to remove the parent page from the EPC. As such, VMM is able to prevent removal of the parent page in the EPC in order to support oversubscription without putting an additional exiting and tracking burden on the VMM.

FIG. 1 is a block diagram illustrating a processing device 100 that supports managing enclave memory pages, according to one implementation. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor, which is typically capable of processing a single instruction pipeline, or a multi-core processor, which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one implementation, processing device 100 may include one or more processors cores 110, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another implementation, the processing device 100 may be used in a system on a chip (SoC) system.

The processor core(s) 110 may execute instructions of the processing device 100. The processor cores 110 include, but are not limited to, pre-fetch logic to fetch instructions, decode logic to decode the instructions, execution logic to execute instructions and the like. The processor cores 110 include a cache (not shown) to cache instructions and/or data. The cache includes, but is not limited to, a level one, level two, and a last level cache (LLC), or any other configuration of the cache memory within the processing device 100. The processor core 110 may be used with a computing system on a single integrated circuit (IC) chip of a computing system. One implementation of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like.

In one implementation, the processing device 100 may include a VMM 120. VMM 120 may also be referred to as a hypervisor. The VMM 120 may be abstract a physical layer of a hardware platform of a host computer system that may include processing device 100, and present this abstraction to a VM (may also be referred to as a "guest") 130 hosted by the host computer system. The VMM 120 provides a virtual operating platform for the VM 130, and manages the execution of the VM 130. In some implementations, the VMM 120 may manage more than one VM 130.

The VM 130 may be a software implementation of a machine that executes programs as though it was an actual physical machine. The programs may include a guest operating system (OS), such as guest OS 150, and other types of software and/or applications. In one implementation, VM 130 includes EPC memory 140. The EPC memory 140 provides a secure place for an application of the VMs 130 to execute code and store data inside the context of an OS process. In one implementation, the EPC memory 140 includes enclave memory pages, such as a parent page 142 and a plurality of child pages 144a-144n associated with the parent page 142. The parent page 142 includes metadata about the EPC memory 140. Such metadata includes size of the EPC memory 140, base address of the EPC memory 140, total number of child pages 144, and so on. Each of the plurality of child pages 144a-144n includes an address, which points to an address of the parent page 142. In one implementation, the parent page 142 and/or the child pages 144a-144n may be loaded from a memory (not shown) via a bus (not shown) into the EPC memory 140 of the VM 130.

In one implementation, the parent page 142 and/or the child pages 144a-144n may be evicted from the EPC memory 140 into the memory via the bus. In one implementation, the VMM 120 loads and/or evicts the parent page 142 and/or the child pages 144a-144n without the VM 130 being aware of the loading and/or evicting of the parent page 142 and/or child pages 144a-144n. In one implementation, the VM 130 loads and evicts the parent page 142 and/or the child pages 144a-144n under supervision of the VMM 120.

In one implementation, the parent page 142 includes a first child counter 160 (a.k.a. physical counter), which includes a first value of a total number of child pages 144a-144n physically present in the EPC memory 140. The first child counter 160 may be part of a metadata in the parent page 142. As such, each parent page 142 included in EPC memory 140 may have its own first child counter 160. In one implementation, the first child counter 160 counts a number of child pages 144a-144n physically evicted from the EPC memory 140. In one implementation, a child page is physically evicted by removing the content of the child page and storing the content in an encrypted form in memory, thus the child page is completely empty and is available to be evicted or removed from the EPC. In one implementation, the first value of the total number of child pages 144a-144n in the first child counter 160 is decremented by a value of 1 upon physical eviction of one of the individual child pages 144a-144n. In one implementation, the first child counter 160 counts a number of child pages 144a-144n physically loaded into the EPC memory 140. In one implementation, the first value of the total number of child pages 144a-144n in the first child counter 160 is incremented by a value of 1 when any of the individual child pages 144a-144n are physically loaded into the EPC memory 140.

In a first example, the EPC memory 140 may initially include 5 child pages, 144a-144n, all of which are initially physically loaded into the EPC memory 140. As such, the first value of the first child counter 160 is initially set to 5. Every time a child page among the 5 child pages 144a-144n is physically evicted from the EPC memory 140, the first value of the first child counter 160 is decremented by 1 until all 5 child pages 144a-144n are physically evicted from the EPC memory 140. As a result, the first value of the first child counter 160 changes from 5 to 0 as the child pages 144a-144n are physically evicted from EPC memory 140.

In another second example, the EPC memory 140 may not include any child pages 144a-144n. As a result, the first value of the first child counter 160 is initialized to 0. Thereafter, any time a child page 144a-144n is physically loaded into the EPC memory 140, the first value of the first child counter 160 is incremented by a value of 1 until all 5 child pages 144a-144n are physically loaded into the EPC memory 140. This results in the first value of the first child counter 160 changing from 0 to 5 as child pages 144a-144n are physically added to the EPC memory 140.

In one implementation, the parent page 142 includes a second child counter (a.k.a. virtual counter) 170, which includes a second value of a total number of child pages 144a-144n that are currently not present in the EPC memory 140 (e.g., due to paging by the VMM 120). The second child counter 170 may be part of a metadata in the parent page 142.). As such, each parent page 142 included in EPC memory 140 may have its own second child counter 170. As discussed above, VMM paging may include, but is not limited to, loading of the parent page 142 and the child pages 144a-144n into the EPC memory 140, accessing the parent page 142 and the child pages 144a-144n in the EPC memory 140, and evicting the parent page 142 and the child pages 144a-144n from the EPC memory 140. In one implementation, VMM paging of the child pages 144a-144n supports oversubscription. As discussed above, oversubscription includes sharing the EPC pages, i.e. parent page 142 and the child pages 144a-144n among a plurality of VMs. Accordingly, the child pages 144a-144n that are currently not in the VM 130 may be being used by another VM (not shown). In one implementation, the second child counter 170 is operated similarly to the first child counter 160 by counting a number of child pages 144a-144n physically evicted from the EPC memory 140 but virtually present in the EPC memory 140 and by counting the number of child pages 144a-144n physically loaded into the EPC memory 140, but virtually not present in the EPC memory 140. In one implementation, the second child counter 170 counts in reverse as compared to the count by the first child counter 160. In one implementation, the second value of total number of child pages 144a-144n in the second child counter 170 is incremented by a value of 1 upon physical eviction of one or more of the individual child pages 144a-144n only due to the VMM paging.

Referring back to the first example above where the EPC memory 140 initially included 5 child pages 144a-e physically loaded into the EPC memory 140, the first value of first child counter is initialized to 5. Correspondingly, in this first example, the second value of the second child counter 170 is initialized to 0 since these none of these 5 child pages are not virtually present in the EPC memory 140. This initial value of 0 for the second child counter 170 also indicates that all none of the 5 child pages 144a-144e that are physically present in the EPC memory 140 are currently being utilized for VMM paging. Every time a child page among the 5 child pages 144a-144n is physically evicted from the EPC memory 140 for VMM paging, the second value of the second child counter 170 is incremented by 1 until all 5 child pages 144a-144n are physically evicted from the EPC memory 140 for VMM paging. When all 5 child pages 144a-144n are physically evicted from EPC memory 140, the second value of the second child counter 170 is at a value of 5. As such, the second value indicates that all 5 child pages 144a-144n are physically evicted from the EPC memory 140 for VMM paging but are virtually present in the EPC memory 140.

Referring back to the second example above, where the EPC memory 140 initially included 0 child pages 144a-144n, the first value of the first child counter was initialized to 0. Correspondingly, in this second example, as none of the 5 child pages 144a-144n are physically present in the EPC memory, the VMM determines 120 that all 5 child pages are physically removed from the EPC memory 140 for VMM paging but are virtually present in the EPC memory, and therefore initializes the second value of the second child counter 170 to be 5. Thereafter, any time a child page 144a-144n is physically loaded back into the EPC memory 140, the second value of the second child counter 170 is decremented by a value of 1 until all 5 child pages 144a-144n are physically loaded into the EPC memory 140. This results in the second value of the second child counter 170 changing from 5 to 0.

In one implementation, the VMM 120 manages physical loading and physical evicting of the parent page 142 and the corresponding child pages 144a-144e. In one implementation, the VMM 120 prevents removal of the parent page 142 in the EPC memory 140 even when one or more of the corresponding child pages 144a-144n have been physically evicted from the memory for VMM paging.

In one implementation, the VMM 120 may receive a request from the VM 130 to evict the parent page 142. In response to the received request to evict the parent page 142, the VMM 120 examines the first count value of the first child counter 160. In one implementation, the VMM 120 determines that the first count value in the first child counter 160 is not 0 (i.e., one or more child pages 144a-144n are physically present in the EPC memory 140). In response to the non-zero value in the first child counter 160, the VMM 120 may generate a first error code. In one implementation, the first error code is generated when the first count value in the first child counter 160 is greater than 0. The first error code indicates that one or more corresponding child pages 144a-144n are physically present in the EPC memory 140. In one implementation, the first error code is sent to the VM 130. In one implementation, the first error code prevents the VM 130 from evicting the parent page 142 when the child pages 144a-144n associated with the parent page 142 are physically present in the EPC memory 140.

In one implementation, the VMM 120 determines that the first count value in the first child counter 160 is 0, i.e. none of the child pages 144a-144n are physically present in the EPC memory 140. In one implementation, upon determining that the first count value is 0, the VMM 120 further examines the second count value in the second child counter 170. In one implementation, the VMM 120 determines that the second count value in the second child counter 170 is not 0. This non-zero value of the second count value of the second child counter 170 indicates that one or more child pages 144a-144n (that were previously physically present in the EPC memory 140) associated with the parent page 142 are not currently physically present in the EPC memory 140 but are virtually present in the EPC memory 140 as they are being used for VMM paging (i.e. shared by another VM). In one implementation, the VMM generates a second error code when the second count value for the second child counter 170 is not 0 (e.g., non-zero or greater than zero).

The second error code indicates that one or more child pages 144a-144n are virtually present in the EPC memory 140 as they being used for VMM paging. In one implementation, the second error code is sent to the VM 130. In one implementation, the second error code prevents the VM 130 from evicting the parent page 142 when the one or more child pages 144a-144n associated with the parent page 142 the EPC memory 140 are being used for VMM paging (such as sharing the one or more child pages 144a-144n with another VM). In one implementation, the second count value of the second child counter 170 is 0. This 0 value of the second count value of the second child counter 170 indicates that none of the child pages 144a-144n associated with the parent page 142 are being used for the VMM paging. In one implementation, when the first count value is 0 such that is there are no child pages 144a-144n physically present in the EPC memory and when the second count value is 0 such that the child pages 144a-144n that are not virtually present in the EPC memory 140 as they are not being used for the VMM paging, the VMM 120 removes the parent page 142 from the EPC memory 140. In one implementation, the parent page 142 is allowed to be removed from the EPC memory 140 when the child pages 144a-144n that are not present in the EPC memory 140 may have been previously evicted.

Figure 2:
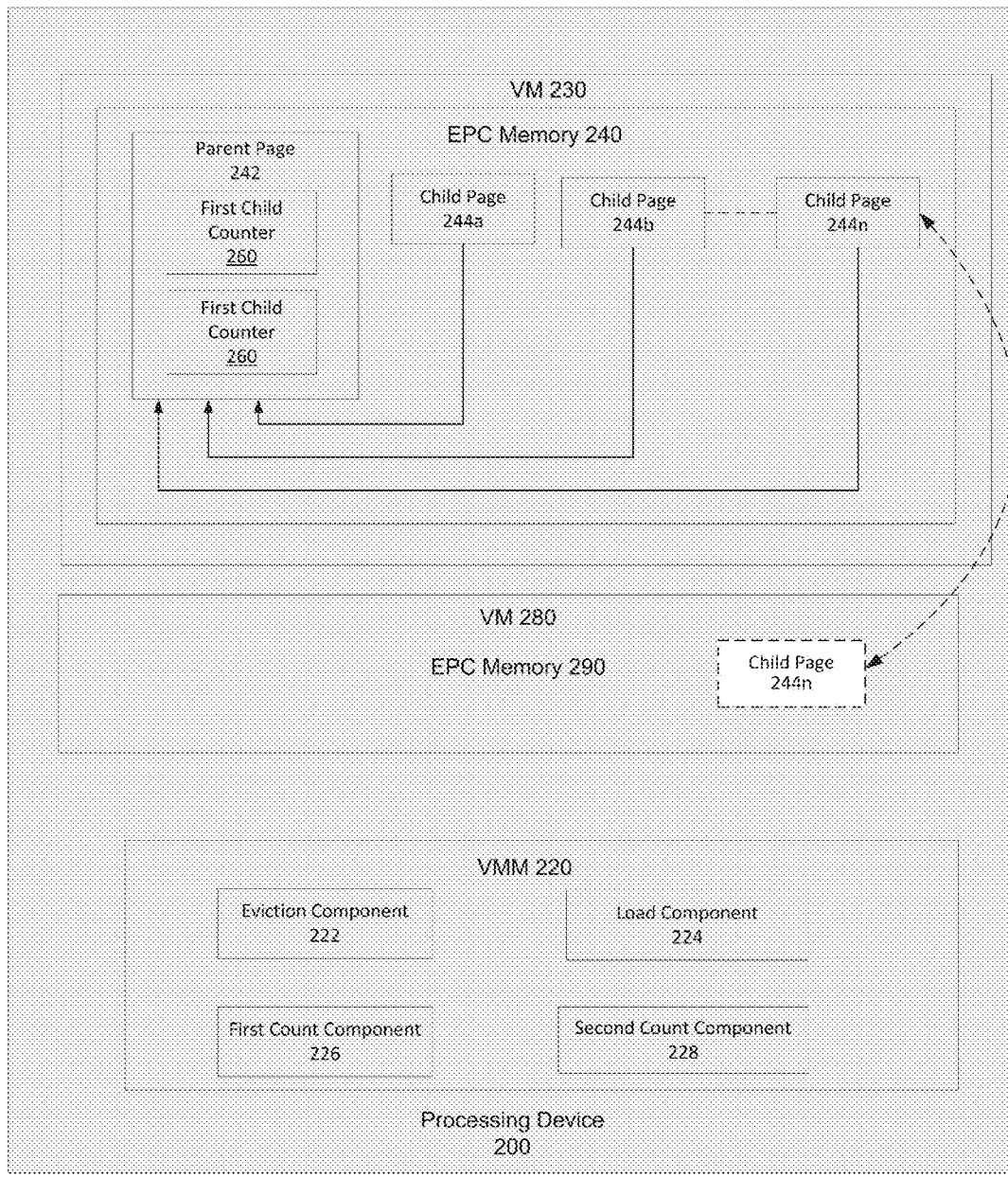
FIG. 2 illustrates a virtual machine monitor for managing enclave memory pages in the enclave memory according to an implementation of the disclosure.

FIG. 2 illustrates a processing device 200 including a VMM 220, a first VM 230, a first child counter 260, a second child counter 270 and a second VM 280 to implement an instruction set architecture environment, in accordance with one implementation of the disclosure. In one implementation, the processing device 200 is same as processing device 100 described above with respect to FIG. 1. In one implementation, the first child counter 260 is same as the first child counter 160 described above with respect to FIG. 1. In one implementation, the second child counter 270 is same as the second child counter 170 as described with respect to FIG. 1. In one implementation, the VMM 220 is the same as VMM 120 described above with respect to FIG. 1.

In one implementation, the first VM 230 is same as the VM 130 as described above with respect to FIG. 1. In one implementation, the first EPC memory 240 is same as the EPC memory 140 as described with respect to FIG. 1. In one implementation, the first parent page 242 is same as the first parent page 142 with respect to FIG. 1. In one implementation, the first child pages 244a-244n are same as the child pages 144a-144n with respect to FIG. 1. The first child counter 260 and the second child counter 270 may be part of metadata of the parent page 242 in FIG. 2.

In one implementation, the second VM 280 functions similar to the first VM 230. In one implementation, the second VM 280 includes a second EPC memory 290, which is similar to the first EPC memory 240. In one implementation, the second EPC memory 290 includes enclave memory pages similar to the first EPC memory 240.

The VMM 220 may include eviction component 222, load component 224, a first count component 226 and a second count component 228. In one implementation, each of these components performs certain operations. More or less components may be included in the VMM 220 without loss of generality.

In one implementation, the VMM 220 identifies a child page among one or more child pages e.g., child pages 244a-244n to be physically evicted from the first EPC memory 240 The VMM 220 may identify which child page to be physically evicted when the contents of that child page have been removed and thus that child page is empty and available. As discussed above, the contents of the child page may be stored in an encryption form in a memory. In one implementation, the VMM 220 receives a request from the second VM 280 to access a child page among one or more child pages 244a-244n) from the first EPC memory 240 of the first VM 230. In one implementation, the eviction component 222 physically removes the child page (whose content have been removed and thus is empty and available), For example, a first child page 244n is physically evicted from the first EPC memory 240 of the first VM 230. In one implementation, the counter component 226 decrements the first count value of the first child counter 260 by 1 as there is one less first child page 244n physically present in the first EPC memory 240. In one implementation, the counter component 226 increments the second count value of the second child counter 270 by 1 since there is one first child page 244n that is virtually present in the EPC memory 240 that could be utilized for VMM paging such as sharing by the second VM 280. In one implementation, the VMM 220 physically removes the first child page 244n from the first EPC memory and physically places it in the second EPC memory 290 of the second VM 280.

In one implementation, the VMM 220 further identifies when the child page is to be physically loaded into the EPC memory. In one implementation, the VMM 220 receives a request from the first VM 230 to access the first child page from the first EPC memory 240. In one implementation, the VMM 220 determines that the child page requested by the second VM is same as the first child page, i.e. the first child page 244n that was previously physically removed from the first EPC memory 240 and provided to the second VM 280. In one implementation, the VMM 220 determines that the second VM 280 is no longer utilizing the first child page 244n that was removed from the first EPC memory 240 of the first VM 230. In one implementation, the VMM 220 retrieves the first child page 244n from the second VM 280. In one implementation, the load component 224 physically loads the first child page 244n back into the first EPC memory 240. In one implementation, the counter component 226 increments the first count value of the first child counter 260 since there is one child page that is now physically added in the first EPC memory 240. In one implementation, the counter component 226 decrements the second count value of the second child counter 270 since there is one less child page virtually present in the first EPC memory 240.

In one implementation, the VMM 220 receives a request from the first VM 230 to physically evict the first parent page 242 from the first EPC memory 240. In one implementation, the first count component 226 determines the first count value in the first child counter 260. In one implementation, the VMM 220 generates the first error code when the first count value in the first child counter 260 is not 0. As discussed above, the first error code indicates that one or more child pages are physically present in the EPC memory 240. As such, the first parent page 242 is not allowed to be removed when one or more of the first child pages 244a-244n are physically present in the EPC memory. In one implementation, the first error code is sent to the first VM 230.

In addition, in response to receiving the instructions/request from the first VM 230 to evict the first parent page 242 and determining that the first count value of the first child counter is 0, the second count component 228 determines the second count value in the second child counter 270. In one implementation, responsive to the second count component 228 determines that the second count value in the second child counter 270 is not 0, the VMM 220 generates a second error code. As discussed above, the second error code indicates that one or more of the first child pages 244a-244n of the first EPC memory 240 is virtually present in the EPC memory 240 as is currently being utilized for the VMM paging, such as being shared by the second VM 280. As such, the first parent page 242 is not allowed to be removed when the one or more first child pages 244a-244n of the EPC memory 140 is virtually present in the EPC memory 140 as is undergoing VMM paging. In one implementation, the second error code is sent to the second VM.

In one implementation, responsive to the count component 220 determines that the second count value in the second child counter 270 is 0 (in addition to the first count value of the first child counter 270 being 0), this indicates that the one or more first child pages 244a-244n are that are not physically present in the EPC memory 240 are also not virtually present in the EPC memory 240 as are not undergoing VMM paging. In one implementation, the VMM 220 removes the first parent page 242 from the first EPC memory 240 when the second count value in the second child counter 260 is 0 (and the first count value in the first child counter 270 is 0).

Figure 3:
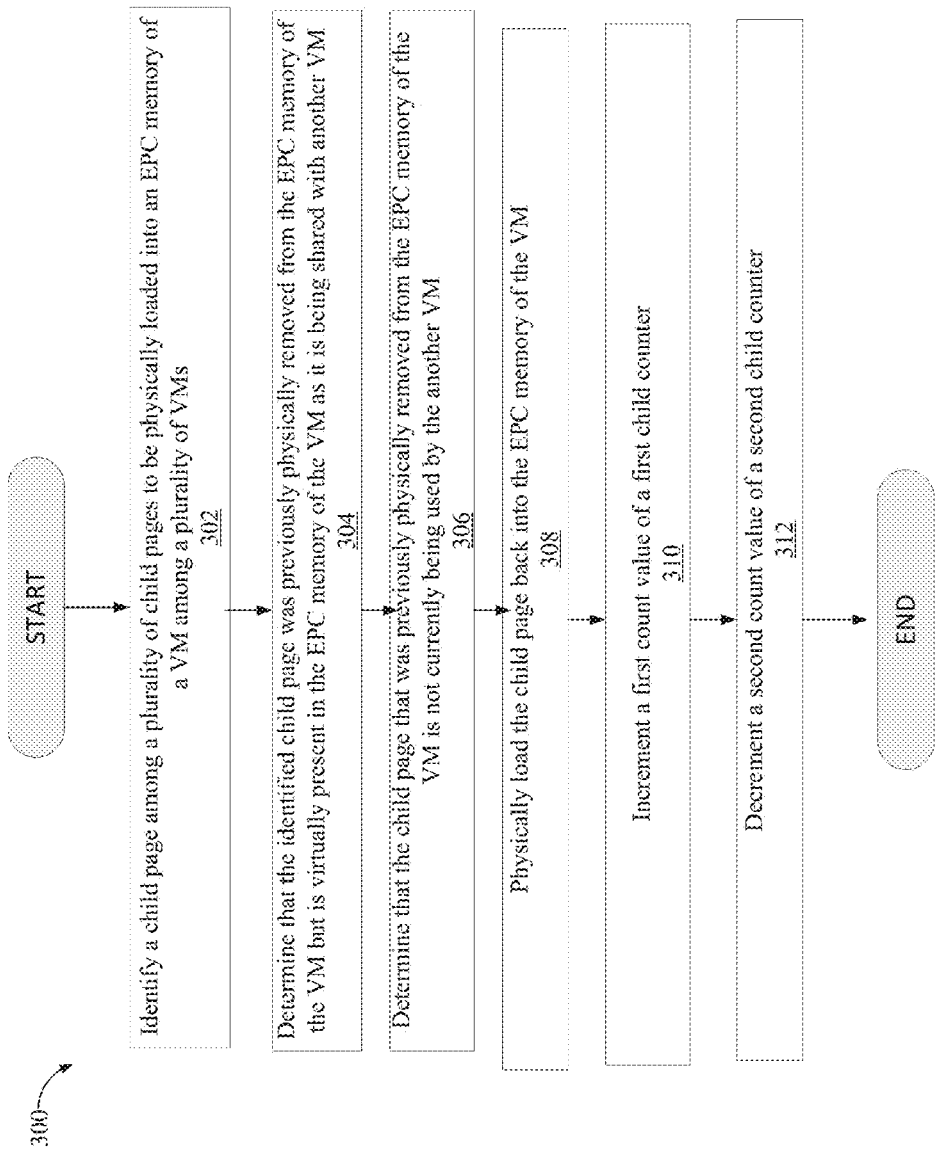
FIG. 3 illustrates a flow diagram of a method for managing enclave memory pages according to an implementation of the disclosure.

FIG. 3 is a flow diagram of a method 300 for managing enclave memory pages of a VM in a processing device according to an embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by the VMMs 120 and 220 as described above with respect to FIGS. 1 and 2.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

At block 302, processing logic identifies a child page among a plurality of child pages to be physically loaded into an EPC memory of a VM among a plurality of VMs. As discussed above, the EPC memory is a secure place for an application of the VMs to execute code and store data inside the context of an OS process. Also, as discussed above, the EPC memory includes enclave memory pages such as a parent page, and a plurality of child pages. The parent page includes metadata about the EPC memory. Such metadata includes size of the EPC memory base address of the EPC memory, total number of child pages, and so on. Each of the plurality of child pages includes an address, which points to an address of the parent page.

In one implementation, the processing logic identifies the child page as part of receiving a request from the VM to access the child page from the EPC memory of the VM. At block 304, the processing logic determines that the identified child page was previously physically removed from the EPC memory of the VM but is virtually present in the EPC memory as it is being shared with another VM. At block 306, the processing logic determines that the child page that was previously physically removed from the EPC memory of the VM is currently not being used by the another VM.

At block 308, processing logic physically loads the child page back into the EPC memory of the VM. In one implementation, the processing logic physically evicts the child page from the EPC memory of the another VM prior to physically loading the child page into the EPC memory of the VM. In one implementation, a child page is evicted from the EPC memory of a VM when the child page is marked invalid. At block 310, processing logic increments a first count value of a first child counter. As discussed above, the first child counter counts a number of child pages physically present in the EPC memory. Also, as discussed above, the first count value is a total number of the child pages physically present into the EPC memory. At block 310, processing logic decrements a second count value of a second child counter. As discussed above, the second child counter counts a number of child pages of the EPC memory that are virtually present as they are being shared by another VM. Also, as discussed above, the second count value is the total number of child pages virtually present in the EPC memory of the VM as they are being shared by another VM.

Figure 4:
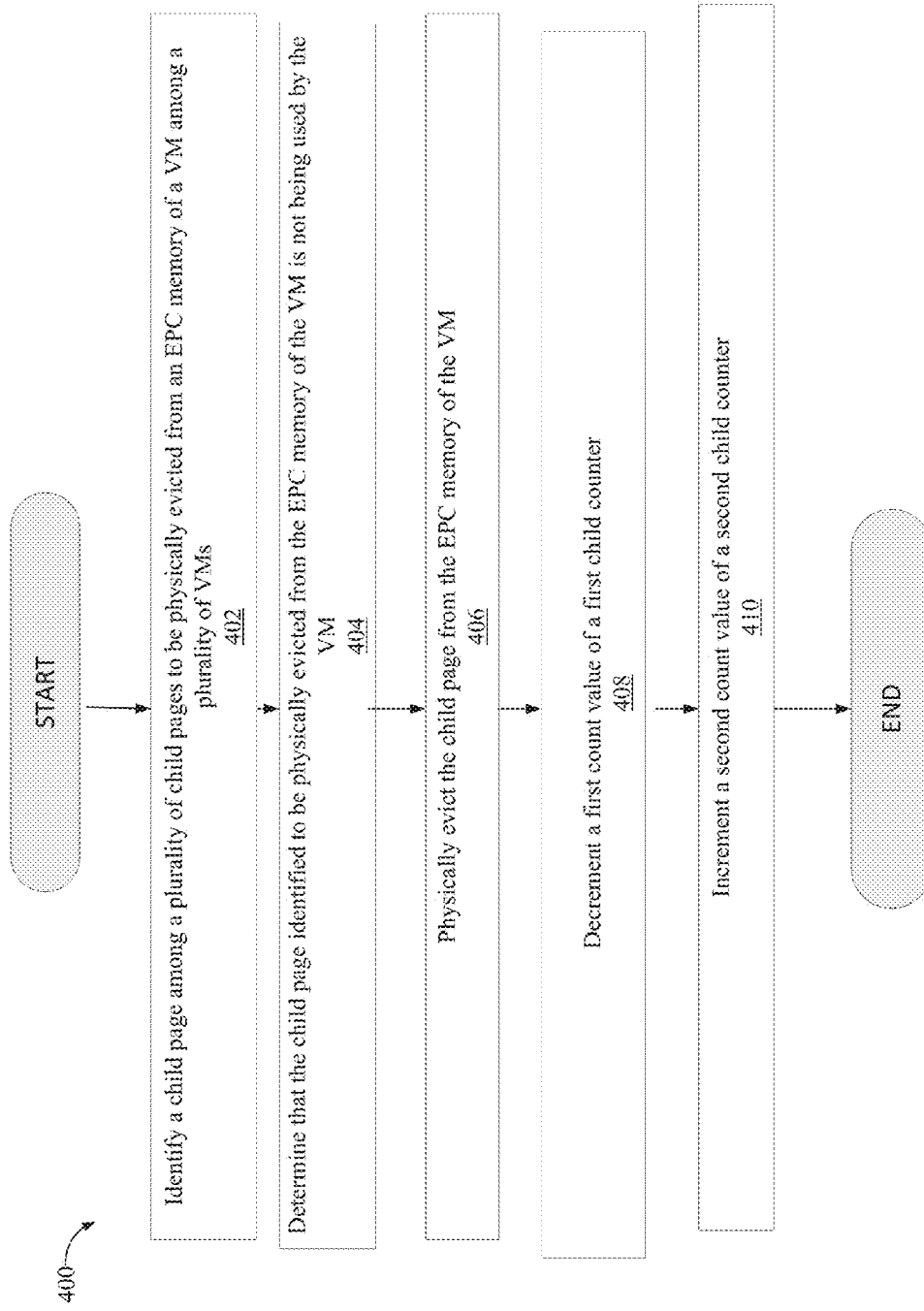
FIG. 4 illustrates a flow diagram for another method for managing enclave memory pages according to an implementation of the disclosure.

FIG. 4 is a flow diagram of another method 400 for managing enclave memory pages of a VM in a processing device according to an embodiment of the disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by the VMMs 120 and 220 as described above with respect to FIGS. 1 and 2.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

At block 402, processing logic identifies a child page among a plurality of child pages to be physically evicted from an EPC memory of a VM among a plurality of VMs. In one implementation, the processing logic identifies the child page by receiving a request from another VM among the plurality of VMs to access the child page from an EPC memory of the VM. At block 404, the processing logic determines that the child page identified to be physically evicted is not being used by the VM. At block 406, processing logic physically evicts the child page from the EPC memory of the VM. In one implementation, a child page is evicted from the EPC memory of a VM when the child page is marked invalid. At block 408, processing logic decrements a first count value of a first child counter. As discussed above, the first count value is a total number of child pages physically present in the EPC memory. At block 410, processing logic increments a second count value of a second child counter. As discussed above, the second count value is a total number of child pages of the EPC memory that are virtually present in the EPC memory of the VM as they are being shared by the another VM.

Figure 5:
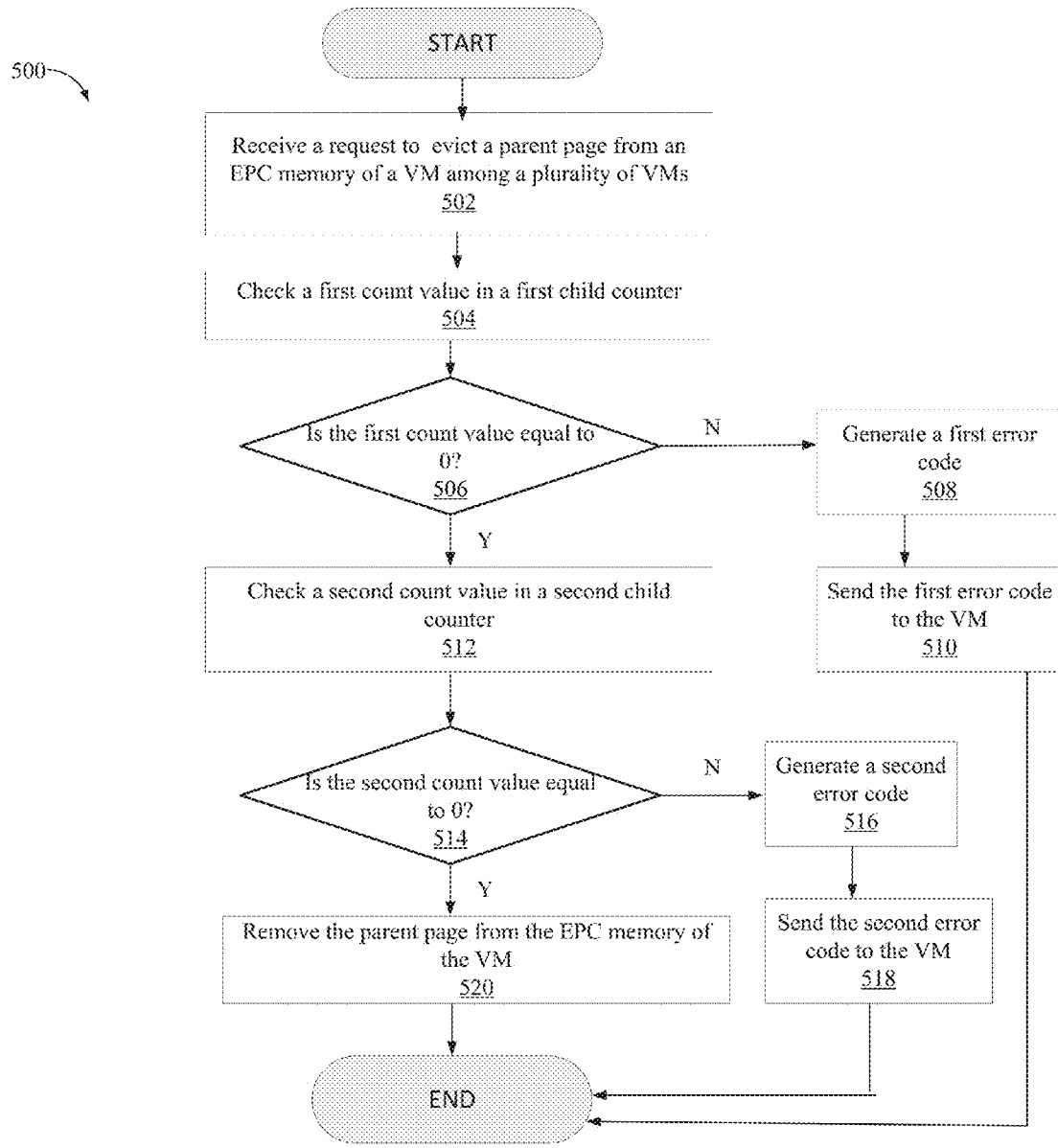
FIG. 5 illustrates a flow diagram of a further method for managing enclave memory pages according to an implementation of the disclosure.

FIG. 5 is a flow diagram of another method 500 for managing enclave memory pages of a virtual machine in a processing device according to an embodiment of the disclosure. Method 500 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 500 may be performed, in part, by the VMMs 120 and 220 as described above with respect to FIGS. 1 and 2.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

At block 502, the processing logic receives a request from a VM among a plurality of VMs to evict a parent page from an EPC memory of the VM. At block 504, processing logic checks a first count value in a first child counter. As discussed above, the first count value is a total number of child pages physically present in the EPC memory. At block 506, processing logic determines whether the first count value is equal to 0. At block 508, processing logic generates a first error code when it is determined that the first count value is not equal to 0. As discussed above, the first error code indicates that one or more child pages that are physically present in the EPC memory of the VM. As such, the parent page is not removed when the child pages are present in the EPC memory.

At block 510, processing logic sends the first error code to the VM. At block 512, processing logic checks a second count value in a second child counter when it is determined that the first count value is equal to 0 (at block 506). At block 514, processing logic determines whether a second count value is equal to 0. As discussed above, the second count value is a total number of child pages that are currently not physically present in the EPC memory of the VM but are virtually present in the EPC memory of the VMM due to VMM paging. Also, as discussed above, the VMM paging includes sharing the EPC pages, i.e. parent page and the child pages of the VM with another VM, which is different from the VM. At block 516, processing logic generates a second error code when it is determined that the second count value is not equal to 0. As discussed above, the second error code indicates that one or more child pages are virtually present in the EPC memory of the VM as they are being used for the VMM paging. At block 518, processing logic sends the second error code to the VM. At block 520, processing logic removes the parent page from the EPC memory when it is determined that the second count value is equal to 0.

Figure 6:
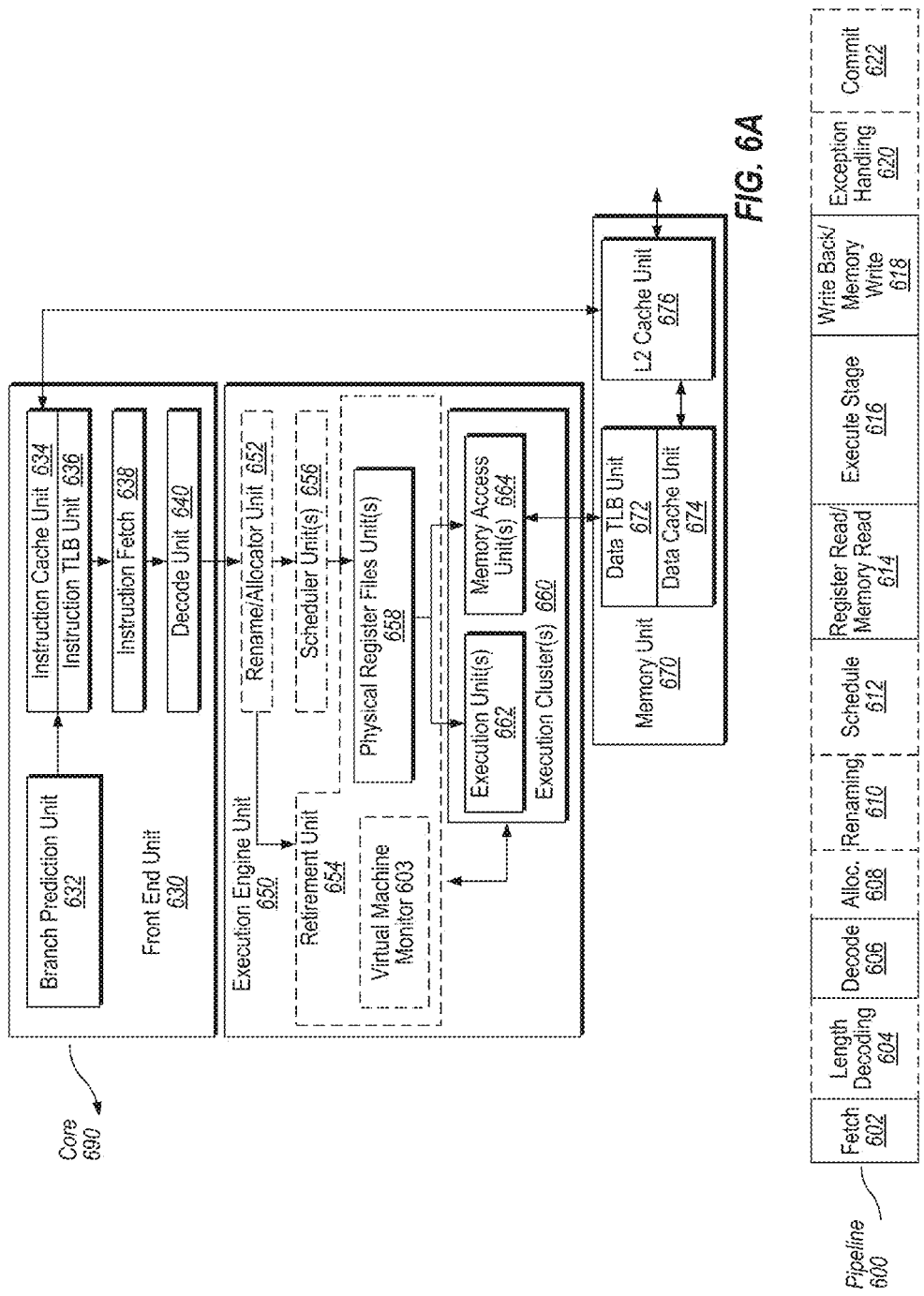
FIG. 6A is a block diagram illustrating a micro-architecture for a processor according to an implementation of the disclosure.
FIG. 6B is a block diagram illustrating an in-order pipeline and a register renaming stage, out-of-order issue/execution pipeline according to an implementation of the disclosure.

FIG. 6A is a block diagram illustrating a micro-architecture for a processor 600 that implements in accordance with one implementation of the disclosure. Specifically, processor 600 depicts an in-order architecture core and a register renaming logic, out-of-order issue/execution logic to be included in a processor according to at least one implementation of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one implementation, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The retirement unit 654 may include a virtual machine monitor 503 to manage enclave memory pages in a trusted execution environment for processing devices according to implementations of the invention The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 656, physical register file(s) unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some implementations DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary implementation, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one implementation, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 600 may be the same as processing device 100 described with respect to FIG. 1 to support platform migration of SEs in a processing device described with respect to implementations of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some implementations of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some implementations, the ordering of stages 602-624 may be different than illustrated and are not limited to the specific ordering shown in FIG. 6B.

Figure 7:
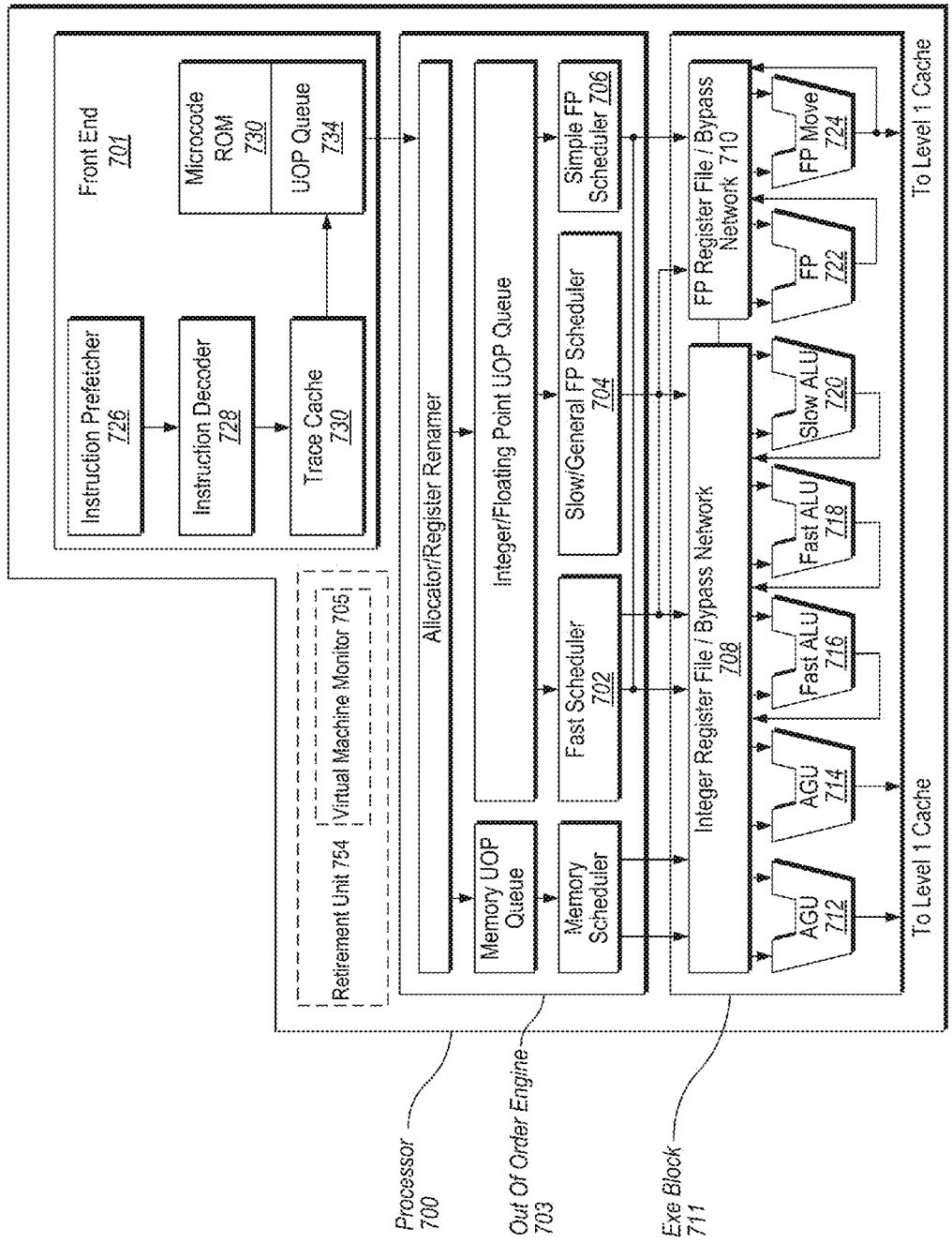
FIG. 7 is a block diagram illustrating a micro-architecture for a processor in accordance with one implementation of the disclosure.

FIG. 7 illustrates a block diagram of the micro-architecture for a processor 700 that includes logic circuits to support platform migration of SEs in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline.

The front end 701 may include several units. In one implementation, the instruction prefetcher 726 fetches instructions from memory and feeds them to an instruction decoder 728 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one implementation, if more than four micro-ops are needed to complete an instruction, the decoder 728 accesses the microcode ROM 732 to do the instruction. For one implementation, an instruction can be decoded into a small number of micro ops for processing at the instruction decoder 728. In another implementation, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one implementation can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one implementation also includes a bypass network that can bypass or forward just completed results that have not yet been written into the register file to new dependent uops. The integer register file 708 and the floating point register file 710 are also capable of communicating data with the other.

For one implementation, the integer register file 708 is split into two separate register files, one register file for the low order 32 bits of data and a second register file for the high order 32 bits of data. The floating point register file 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 722, floating point move unit 724. For one implementation, the floating point execution blocks 722, 724, execute floating point, MMX, SIMD, and SSE, or other operations. The floating point ALU 722 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 716, 718. The fast ALUs 716, 718, of one implementation can execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one implementation, the integer ALUs 716, 718, 720, are described in the context of performing integer operations on 64 bit data operands. In alternative implementations, the ALUs 716, 718, 720, can be implemented to support a variety of data bits including 16, 32, 128, 256, etc. Similarly, the floating point units 722, 724, can be implemented to support a range of operands having bits of various widths. For one implementation, the floating point units 722, 724, can operate on 128 bits wide packed data operands in conjunction with SIMD and multimedia instructions.

In one implementation, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The processor 700 also includes logic to implement store address prediction for memory disambiguation according to implementations of the disclosure. In one implementation, the execution block 711 of processor 700 may include a store address predictor (not shown) for supporting platform migration of SEs.

The processor 700 may include a retirement unit 754 coupled to the execution block 711. The retirement unit 754 may include may include a virtual machine monitor 703 to manage enclave memory pages in a trusted execution environment for processing devices according to implementations of the disclosure.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 8:
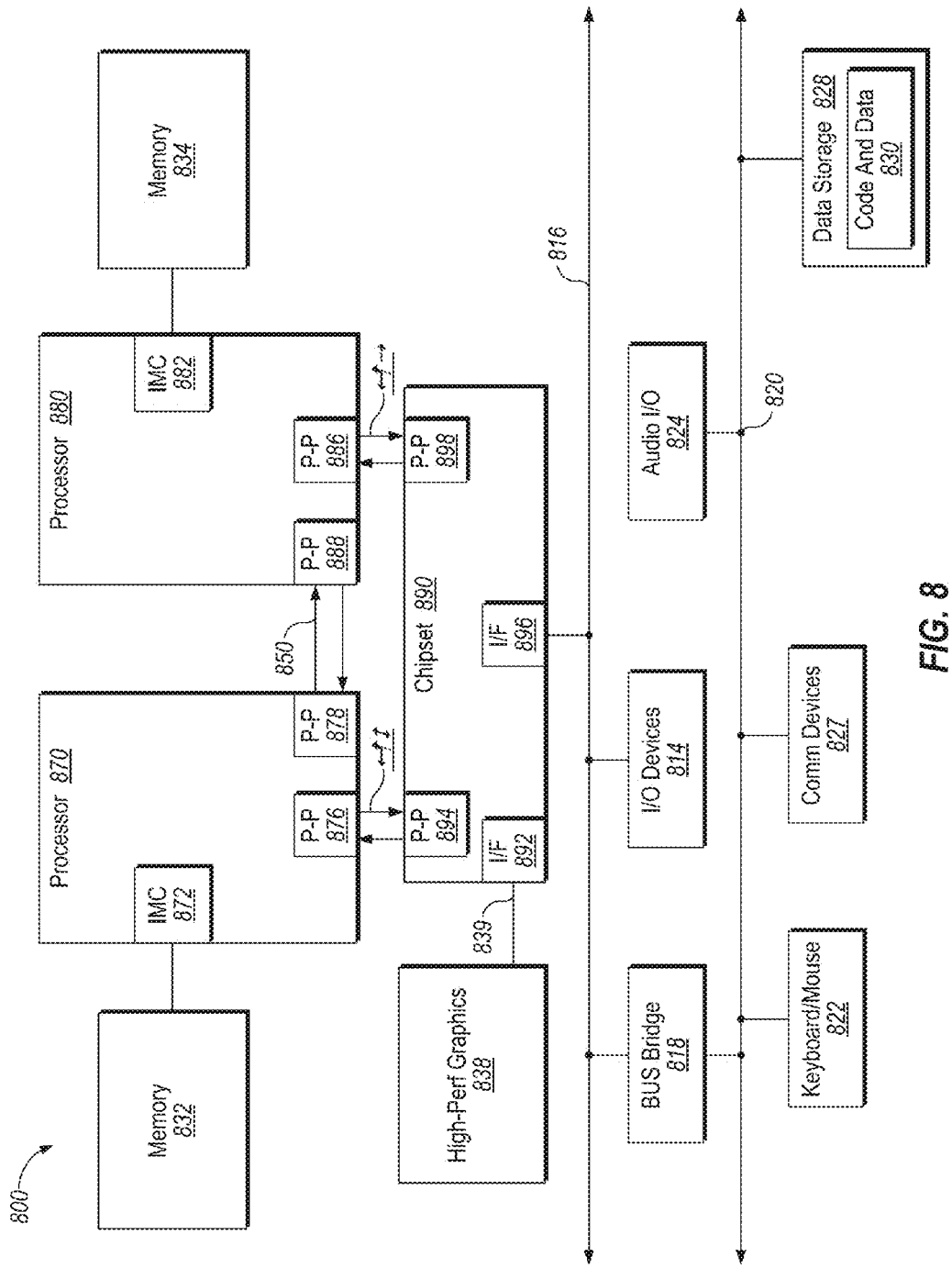
FIG. 8 is a block diagram illustrating a system in which an implementation of the disclosure may be used.

Implementations may be implemented in many different system types. Referring now to FIG. 8, shown is a block diagram illustrating a system 800 in which an implementation of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of implementations of the disclosure is not so limited. In other implementations, one or more additional processors may be present in a given processor. In one implementation, the multiprocessor system 800 may support platform migration of SEs as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one implementation, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one implementation, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one implementation. Further, an audio I/O 824 may be coupled to second bus 820. Note that other architectures are possible. For example, instead of the point-to-point architecture of FIG. 8, a system may implement a multi-drop bus or other such architecture.

Figure 9:
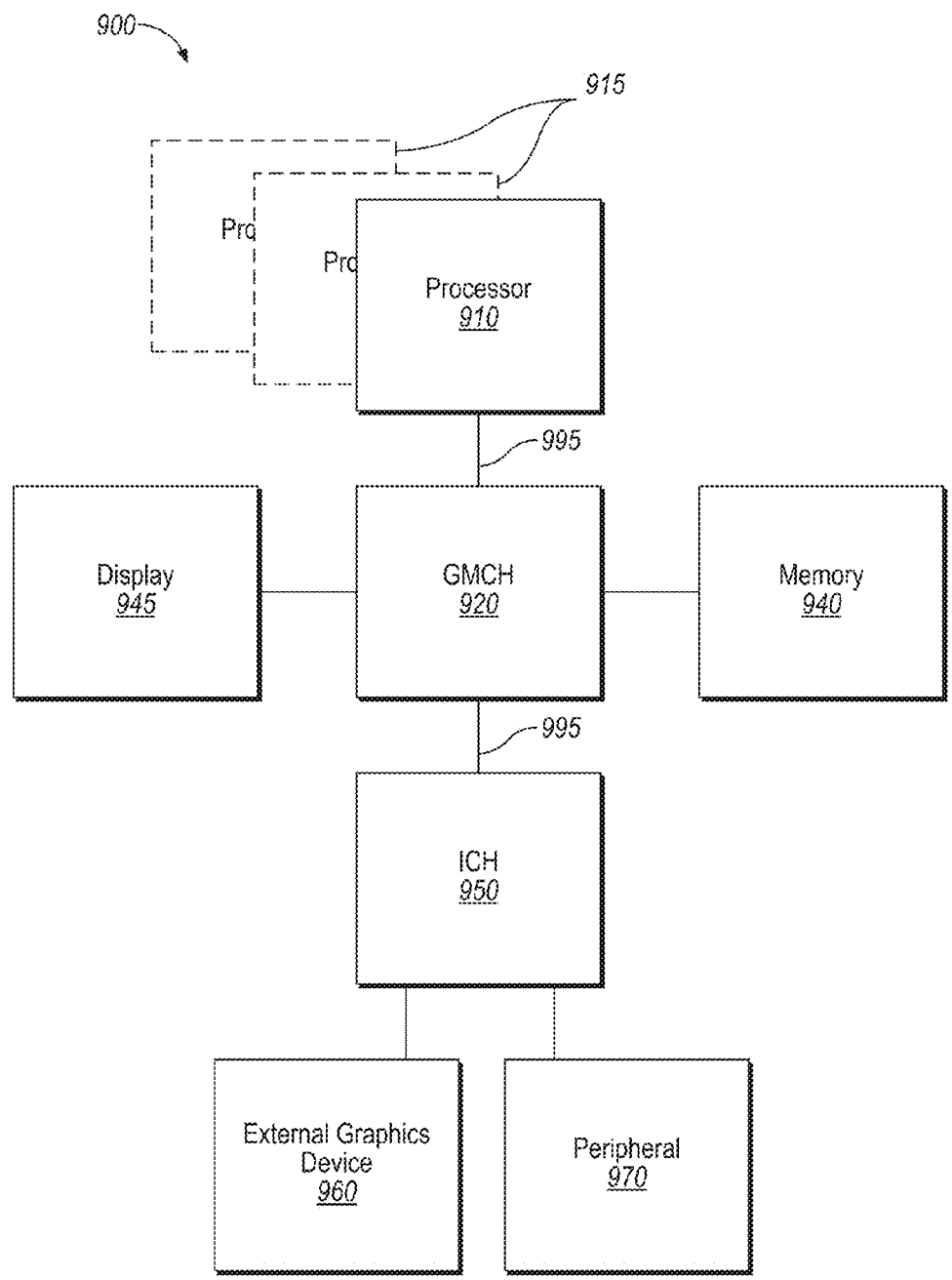
FIG. 9 is a block diagram illustrating a system in which an implementation of the disclosure may operate.

Referring now to FIG. 9, shown is a block diagram of a system 900 in which one implementation of the disclosure may operate. The system 900 may include one or more processors 910, 915, which are coupled to graphics memory controller hub (GMCH) 920. The optional nature of additional processors 915 is denoted in FIG. 9 with broken lines. In one implementation, processors 910, 915 support platform migration of SEs according to implementations of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one implementation, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one implementation, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the implementation of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one implementation, the various processors 910, 915 may reside in the same die package.

Figure 10:
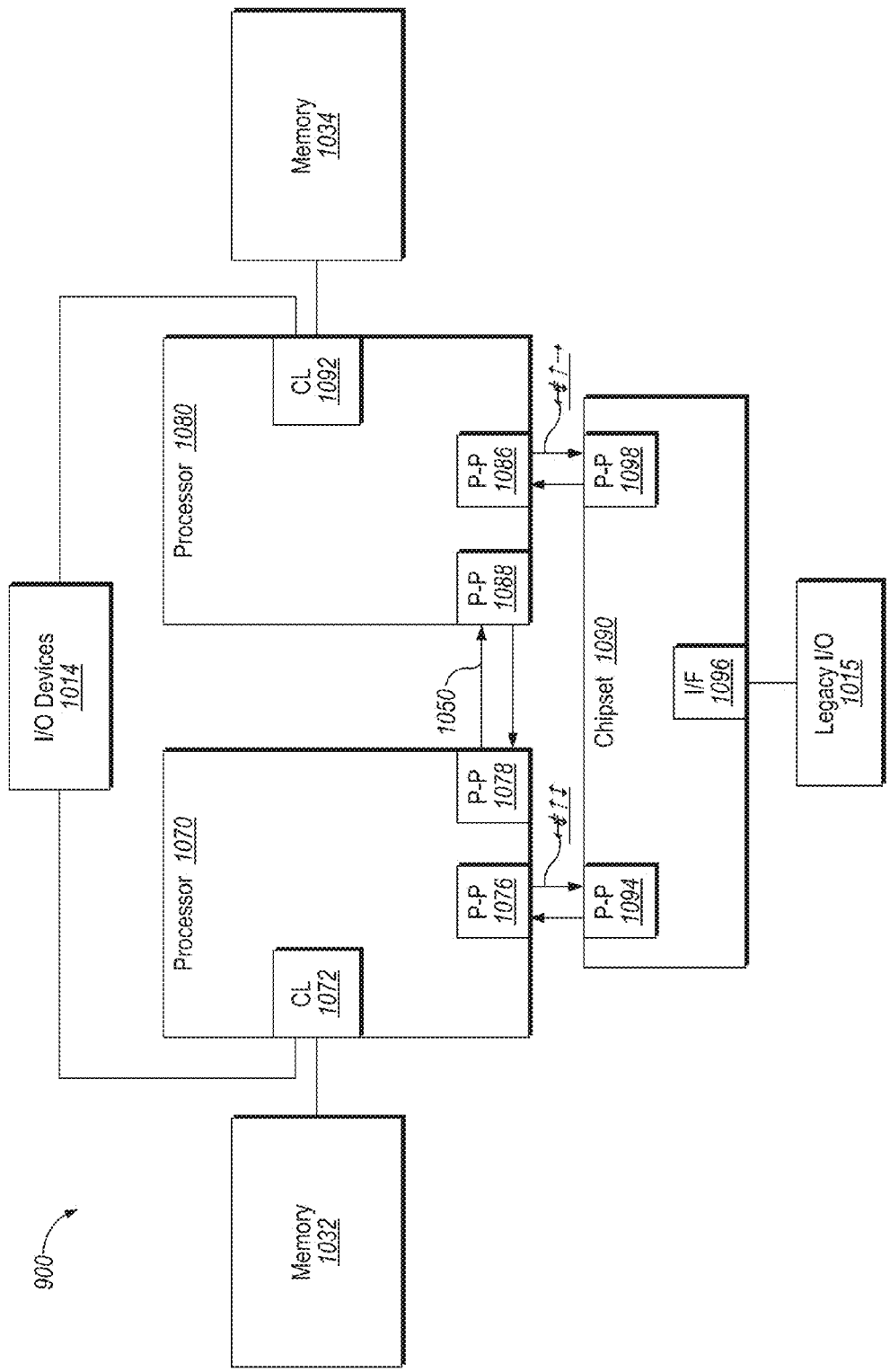
FIG. 10 is a block diagram illustrating a system in which an implementation of the disclosure may operate.

Referring now to FIG. 10, shown is a block diagram of a system 1000 in which an implementation of the disclosure may operate. FIG. 10 illustrates processors 1070, 1080. In one implementation, processors 1070, 1080 may support platform migration of SEs as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one implementation, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
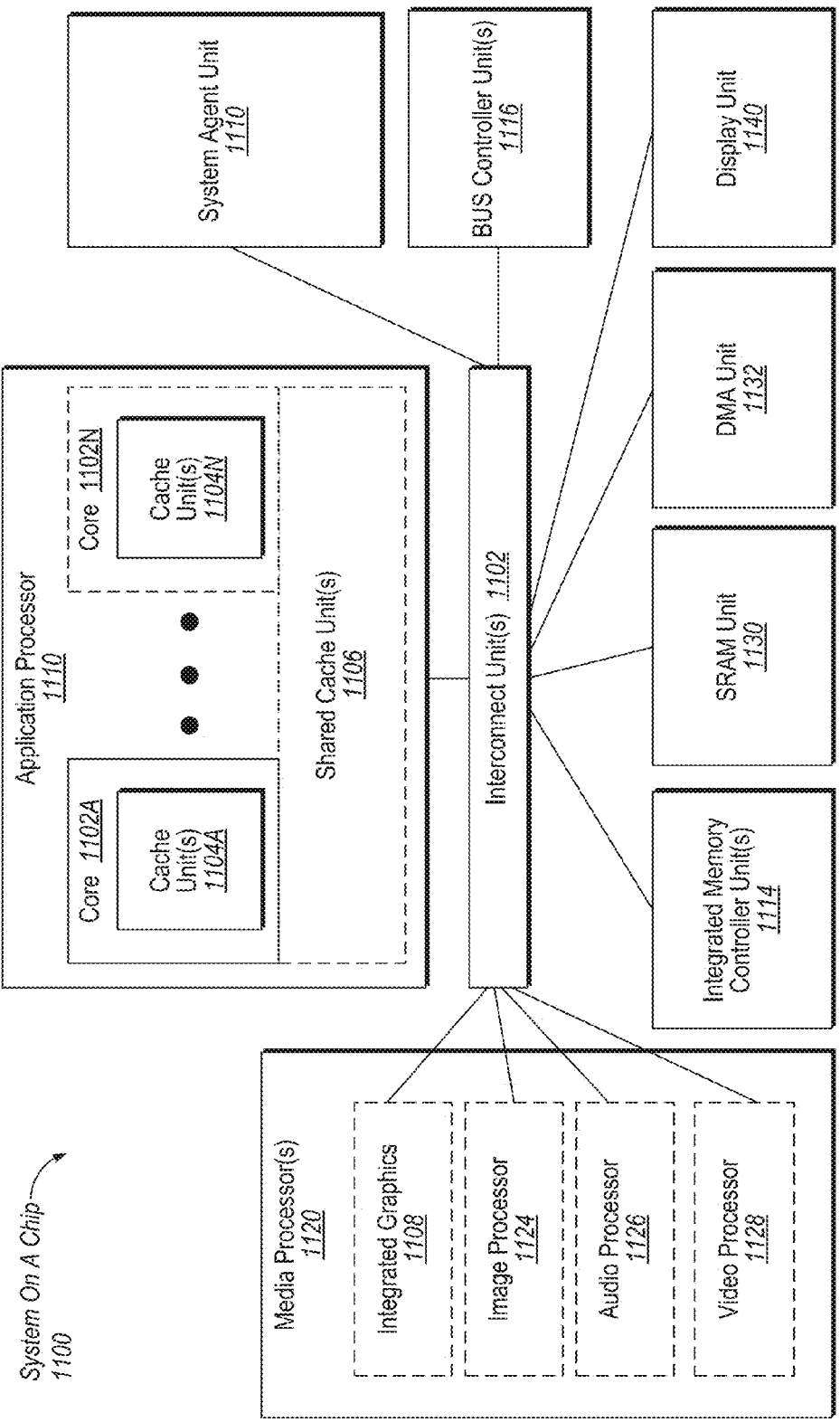
FIG. 11 is a block diagram illustrating a System-on-a-Chip (SoC) according to an implementation of the disclosure.

Implementations may be implemented in many different system types. FIG. 11 is a block diagram of a SoC 1100 in accordance with an implementation of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one implementation, a memory module may be included in the integrated memory controller unit(s) 1114. In another implementation, the memory module may be included in one or more other components of the SoC 1100 that may be used to access and/or control a memory. The application processor 1120 may include a PMU for implementing silent memory instructions and miss-rate tracking to optimize switching policy on threads as described in implementations herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some implementations, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
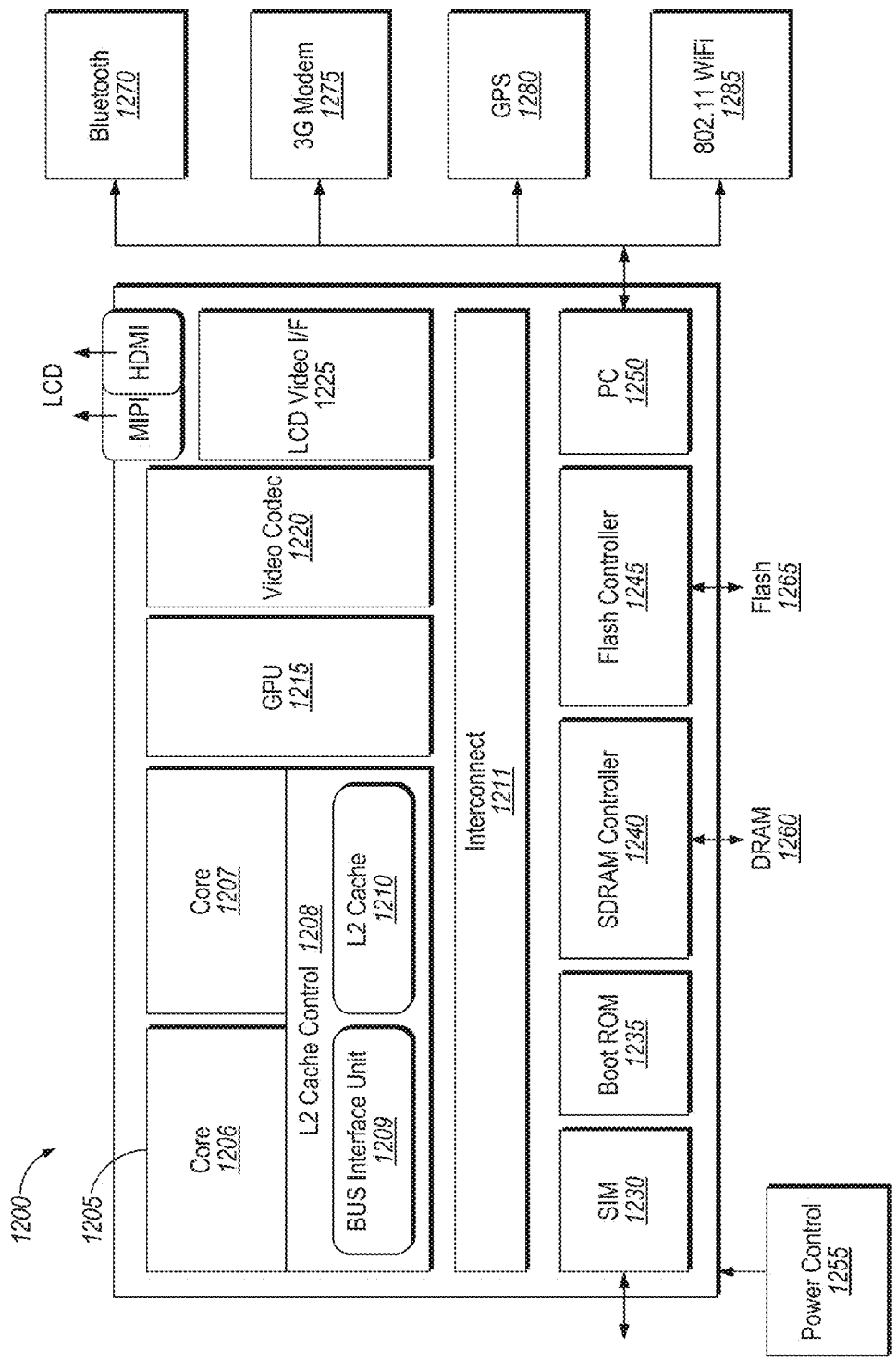
FIG. 12 is a block diagram illustrating a SoC design according to an implementation of the disclosure.

FIG. 12 is a block diagram of an implementation of a system on-chip (SoC) design in accordance with the disclosure. As a specific illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one implementation, cores 1206, 1207 may support platform migration of SEs described in implementations herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
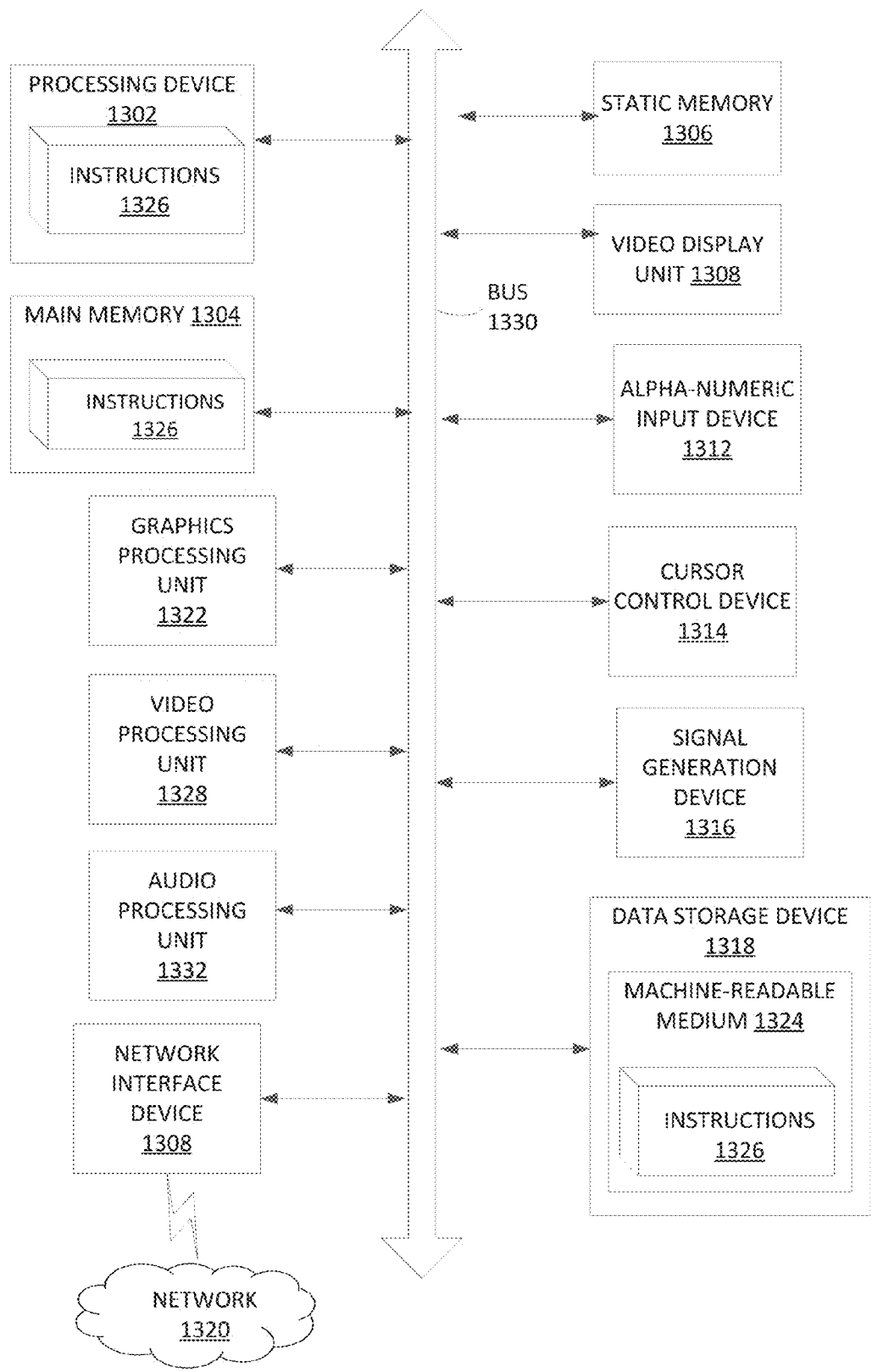
FIG. 13 illustrates a block diagram illustrating a computer system according to an implementation of the disclosure.

FIG. 13 illustrates a diagrammatic representation of a machine in the example form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one implementation, processing device 1302 may include one or processing cores. The processing device 1302 is configured to execute the processing logic 1326 for performing the operations and steps discussed herein. In one implementation, processing device 1302 is the same as processor architecture 100 described with respect to FIG. 1 that implements platform migration of SEs as described herein with implementations of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a non-transitory machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The non-transitory machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the non-transitory machine-accessible storage medium 1324 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further implementations.

Example 1 is a processing device comprising a first counter having a first count value of a number of child pages among a plurality of child pages present in an enclave memory of a first virtual machine (VM), wherein the plurality of child pages are associated with a parent page in the enclave memory; and a second counter having a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

In Example 2, the subject matter of Example 1 can optionally include wherein the processing device to execute a virtual machine monitor (VMM) to responsive to a removal of one of the plurality of child pages from the enclave memory: decrement the first count value of the first counter; and increment the second count value of the second counter.

In Example 3, the subject matter of Examples 1-2 can optionally include wherein the processing device to execute the VMM to responsive to a load of one of the plurality of child pages from the enclave memory: increment the first count value of the first counter; and decrement the second count value of the second counter.

In Example 4, the subject matter of Examples 1-3 can optionally include wherein the VMM to, in response to a request to evict the parent page, determine the first count value of the first counter.

In Example 5, the subject matter of Examples 1-4 can optionally include wherein the VMM to generate a first error code upon determining that the first count value of the first counter is not 0, wherein the first error code indicates that one or more child pages are present in the enclave memory.

In Example 6, the subject matter of Examples 1-5 can optionally include wherein the VMM to determine whether second count value of the second counter is 0 upon determining that the first count value of the first counter is 0.

In Example 7, the subject matter of Examples 1-6 can optionally include wherein the VMM to generate a second error code upon determining that the second count value of the second counter is not 0, wherein the second error code indicates that one or more child pages are currently being shared by the second VM.

In Example 8, the subject matter of Examples 1-7 can optionally include wherein the VMM to evict the parent page from the enclave memory upon determining that the second count value of the second counter is 0.

Example 9 is a system-on-a chip (SoC) comprising a memory; and a processing device communicably coupled to the memory, wherein the processing device comprises a first counter having a first count value of a number of child pages among a plurality of child pages present in an enclave memory of a first virtual machine (VM), wherein the plurality of child pages are associated with a parent page in the enclave memory; and a second counter having a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

In Example 10, the subject matter of Example 9 can optionally include wherein the processing device to execute a virtual machine monitor (VMM) to responsive to a removal of one of the plurality of child pages from the enclave memory: decrement the first count value of the first counter; and increment the second count value of the second counter.

In Example 11, the subject matter of Example 9-10 can optionally include wherein the processing device to execute the VMM to responsive to a load of one of the plurality of child pages from the enclave memory: increment the first count value of the first counter; and decrement the second count value of the second counter.

In Example 12, the subject matter of Examples 9-11 can optionally include wherein the VMM to, in response to a request to evict the parent page, determine the first count value of the first counter.

In Example 13, the subject matter of Examples 9-12 can optionally include wherein the VMM to generate a first error code upon determining that the first count value of the first counter is not 0, wherein the first error code indicates that one or more child pages are present in the enclave memory; and to determine whether second count value of the second counter is 0 upon determining that the first count value of the first counter is 0.

In Example 14, the subject matter of Examples 9-13 can optionally include wherein the VMM to generate a second error code upon determining that the second count value of the second counter is not 0, wherein the second error code indicates that one or more child pages are currently being shared by the second VM.

In Example 15, the subject matter of Examples 9-14 can optionally include wherein the VMM component to evict the parent page from the enclave memory upon determining that the second count value of the second counter is 0.

Example 16 is a method comprising determining a first count value of a number of child pages among a plurality of child pages present in an enclave memory of a first virtual machine (VM), wherein the plurality of child pages are associated with a parent page in the enclave memory; and determining a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

In Example 17, the subject matter of Example 16 can optionally include wherein responsive to a removal of one of the plurality of child pages from the enclave memory, decrementing the first count value of the first counter and incrementing the second count value of the second counter; and responsive to a load of one of the plurality of child pages from the enclave memory, incrementing the first count value of the first counter and decrementing the second count value of the second counter.

In Example 18, the subject matter of Examples 16-17 can optionally include generating a first error code upon determining that the first count value of the first counter is not 0, wherein the first error code indicates that one or more child pages are present in the enclave memory.

In Example 19, the subject matter of Examples 16-18 can optionally include determining whether second count value of the second counter is 0 upon determining that the first count value of the first counter is 0; and generating a second error code upon determining that the second count value of the second counter is not 0, wherein the second error code indicates that one or more child pages are currently being shared by the second VM.

In Example 20, the subject matter of Examples 16-19 can optionally include evicting the parent page from the enclave memory upon determining that the second count value of the second counter is 0.

Example 21 is a non-transitory machine-readable storage medium including instructions that, when accessed by a processing device, cause the processing device to perform operations comprising determining a first count value of a number of child pages among a plurality of child pages present in an enclave memory of a first virtual machine (VM), wherein the plurality of child pages are associated with a parent page in the enclave memory; and determining a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

In Example 22, the subject matter of Example 21 can optionally include wherein the operations further comprising responsive to a removal of one of the plurality of child pages from the enclave memory, decrementing the first count value of the first counter and incrementing the second count value of the second counter; and responsive to a load of one of the plurality of child pages from the enclave memory, incrementing the first count value of the first counter and decrementing the second count value of the second counter.

In Example 23, the subject matter of Examples 21-22 can optionally include wherein the operations further comprising generating a first error code upon determining that the first count value of the first counter is not 0, wherein the first error code indicates that one or more child pages are present in the enclave memory.

In Example 24, the subject matter of Examples 21-23 can optionally include wherein the operations further comprising determining whether second count value of the second counter is 0 upon determining that the first count value of the first counter is 0; and generating a second error code upon determining that the second count value of the second counter is not 0, wherein the second error code indicates that one or more child pages are currently being shared by the second VM.

In Example 25, the subject matter of Examples 21-24 can optionally include wherein the operations further comprising evicting the parent page from the enclave memory upon determining that the second count value of the second counter is 0.

Various implementations may have different combinations of the operational features described above. For instance, all optional features of the methods described above may also be implemented with respect to a non-transitory, computer-readable storage medium. Specifics in the examples may be used anywhere in one or more implementations.

While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A processing device comprising:
   a first counter having a first count value of a number of child pages among a plurality of child pages present in an enclave memory of a first virtual machine (VM), wherein the plurality of child pages are associated with a parent page in the enclave memory; and
   a second counter having a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

2. The processing device of claim 1 wherein the processing device to execute a virtual machine monitor (VMM) to:
   responsive to a removal of one of the plurality of child pages from the enclave memory:
      decrement the first count value of the first counter; and
      increment the second count value of the second counter.

3. The processing device of claim 2 wherein the processing device to execute the VMM to:
   responsive to a load of one of the plurality of child pages from the enclave memory:
      increment the first count value of the first counter; and
      decrement the second count value of the second counter.

4. The processing device of claim 3 wherein the VMM to, in response to a request to evict the parent page, determine the first count value of the first counter.

5. The processing device of claim 4 wherein the VMM to generate a first error code upon determining that the first count value of the first counter is not 0, wherein the first error code indicates that one or more child pages are present in the enclave memory.

6. The processing device of claim 4 wherein the VMM to determine whether second count value of the second counter is 0 upon determining that the first count value of the first counter is 0.

7. The processing device of claim 6 wherein the VMM to generate a second error code upon determining that the second count value of the second counter is not 0, wherein the second error code indicates that one or more child pages are currently being shared by the second VM.

8. The processing device of claim 6 wherein the VMM to evict the parent page from the enclave memory upon determining that the second count value of the second counter is 0.

9. A system-on-a chip (SoC) comprising:
   a memory; and
   a processing device communicably coupled to the memory, wherein the processing device comprises:
      a first counter having a first count value of a number of child pages among a plurality of child pages present in an enclave memory of a first virtual machine (VM), wherein the plurality of child pages are associated with a parent page in the enclave memory; and
      a second counter having a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

10. The SoC of claim 9 wherein the processing device to execute a virtual machine monitor (VMM) to:
    responsive to a removal of one of the plurality of child pages from the enclave memory:
       decrement the first count value of the first counter; and
       increment the second count value of the second counter.

11. The SoC of claim 10 wherein the processing device to execute the VMM to:
responsive to a load of one of the plurality of child pages from the enclave memory:
increment the first count value of the first counter; and
decrement the second count value of the second counter.

12. The SoC of claim 11 wherein the VMM to, in response to a request to evict the parent page, determine the first count value of the first counter.

13. The SoC of claim 11 wherein the VMM to:
generate a first error code upon determining that the first count value of the first counter is not 0, wherein the first error code indicates that one or more child pages are present in the enclave memory; and
to determine whether second count value of the second counter is 0 upon determining that the first count value of the first counter is 0.

14. The SoC of claim 13 wherein the VMM to generate a second error code upon determining that the second count value of the second counter is not 0, wherein the second error code indicates that one or more child pages are currently being shared by the second VM.

15. The SoC of claim 13 wherein the VMM component to evict the parent page from the enclave memory upon determining that the second count value of the second counter is 0.

16. A method comprising:
determining a first count value of a number of child pages among a plurality of child pages present in an enclave memory of a first virtual machine (VM), wherein the plurality of child pages are associated with a parent page in the enclave memory; and
determining a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

17. The method of claim 16 further comprising:
responsive to a removal of one of the plurality of child pages from the enclave memory, decrementing the first count value of the first counter and incrementing the second count value of the second counter; and
responsive to a load of one of the plurality of child pages from the enclave memory, incrementing the first count value of the first counter and decrementing the second count value of the second counter.

18. The method of claim 17 further comprising:
generating a first error code upon determining that the first count value of the first counter is not 0, wherein the first error code indicates that one or more child pages are present in the enclave memory.

19. The method of claim 18 further comprising:
determining whether second count value of the second counter is 0 upon determining that the first count value of the first counter is 0; and
generating a second error code upon determining that the second count value of the second counter is not 0, wherein the second error code indicates that one or more child pages are currently being shared by the second VM.

20. The method of claim 19 further comprising:
evicting the parent page from the enclave memory upon determining that the second count value of the second counter is 0.

21. A non-transitory machine-readable storage medium including instructions that, when accessed by a processing device, cause the processing device to perform operations comprising:
determining a first count value of a number of child pages among a plurality of child pages present in an enclave memory of a first virtual machine (VM), wherein the plurality of child pages are associated with a parent page in the enclave memory; and
determining a second count value of a number of child pages among the plurality of child pages not present in the enclave memory and being shared by a second VM, wherein the second VM is different from the first VM, wherein a non-zero value of at least one of the first counter or the second counter prevents eviction of the parent page from the enclave memory.

22. The non-transitory machine-readable storage medium of claim 21 wherein the operations further comprising:
responsive to a removal of one of the plurality of child pages from the enclave memory, decrementing the first count value of the first counter and incrementing the second count value of the second counter; and
responsive to a load of one of the plurality of child pages from the enclave memory, incrementing the first count value of the first counter and decrementing the second count value of the second counter.

23. The non-transitory machine-readable storage medium of claim 22 wherein the operations further comprising:
generating a first error code upon determining that the first count value of the first counter is not 0, wherein the first error code indicates that one or more child pages are present in the enclave memory.

24. The non-transitory machine-readable storage medium of claim 23 wherein the operations further comprising:
determining whether second count value of the second counter is 0 upon determining that the first count value of the first counter is 0; and
generating a second error code upon determining that the second count value of the second counter is not 0, wherein the second error code indicates that one or more child pages are currently being shared by the second VM.

25. The non-transitory machine-readable storage medium of claim 24 wherein the operations further comprising:
evicting the parent page from the enclave memory upon determining that the second count value of the second counter is 0.

* * * * *